Sept. 2, 1941.   R. W. HAILEY   2,254,570
COOKING VESSEL COVER ASSEMBLY
Filed Oct. 28, 1939

Inventor
Robert W. Hailey
By L. L. Walker
Attorney

Patented Sept. 2, 1941

2,254,570

UNITED STATES PATENT OFFICE 2,254,570

COOKING VESSEL COVER ASSEMBLY

Robert W. Hailey, Bucyrus, Ohio

Application October 28, 1939, Serial No. 301,844

15 Claims. (Cl. 53—1)

The invention pertains to cooking utensils, and more particularly to cookers of the "waterless" type employing temperature indicating and control means, and to means and method of heat transference by which accurate readings of temperature conditions within the vessel may be assured.

It is more or less customary to provide, in association with such cookers, a temperature indicator and a closure controlled vent by which cooking conditions to some extent may be regulated. However, heretofore such thermometer or temperature indicator has usually been mounted to project through the cooker lid into the interior of the vessel where it is surrounded by steam and is subjected to heat transference by convection currents, or by heat radiation through a confined body of dead air, in the event the thermal unit is housed, or enclosed.

Such installations, while affording a reading of the vapor or steam temperature of the interior top of the cooker, do not afford an accurate indication of actual conditions within the cooker. Furthermore, due to imperfect heat transference, the response of the temperature indicator to changing thermal conditions within the vessel is retarded and considerable lag ordinarily occurs between the actual temperature change and its indication. Such indicator units projecting within the cooker space collect deposits, necessitating careful cleaning, and if a leak develops in the enclosing mounting, they may become quite unsanitary.

To overcome these difficulties, in the present instance the temperature indicator is without communication with the interior of the vessel, and is mounted upon an imperforate portion of the vessel lid through which it receives heat transference by direct conduction.

It having been discovered that heat may be more readily transferred from one area to another and even heat distribution effected through walls of varying thickness, the present vessel is formed with tapered side walls and bottom, whereby the temperature is equalized throughout the vessel and more uniformly transferred from the bottom area of maximum temperature through the side walls to the lid, thus subjecting the indicator to an even or mean temperature and avoiding abrupt fluctuations.

The object of the invention is to improve the construction as well as the means and mode of operation of cooking vessels, whereby they will be more efficient in use, and wherein the cooking temperature will be evenly distributed.

A further object of the invention is to provide a compact lid assembly, wherein a temperature indicator unit, a handle knob, and a vent closure are intimately associated in interdependent relation.

A further object of the invention is to provide an improved manner of mounting a handle knob, and of utilizing the knob to open and close a vent opening in the lid.

A further and highly important object is to provide an improved manner of mounting a temperature indicator upon the cooker lid in relation for heat transference by direct conduction.

A further object of the invention is to provide an improved form of temperature indicator having thermal coupling means for directly connecting the thermally responsive element of the indicator with the lid.

A further important object of the invention is to enable the mounting of the temperature indicator, the handle knob and vent closure without the use of rivets or screws, and without perforations in the vessel lid.

A further object of the invention is to provide a cooking vessel having the advantageous structural features and inherent meritorious characteristics herein mentioned.

With the above primary and other incidental objects in view as will more fully appear in the specification, the invention intended to be protected by letters patent consists of the features of construction, the parts and combinations thereof, and the mode of operation, or their equivalents, as hereinafter described or illustrated in the accompanying drawing.

In the drawing, wherein is shown the preferred but obviously not necessarily the only form of embodiment of the invention, Fig. 1 is a perspective view of an assembled cooker embodying the present invention.

Live parts are indicated by similar characters of reference throughout the several views.

Figure 1:
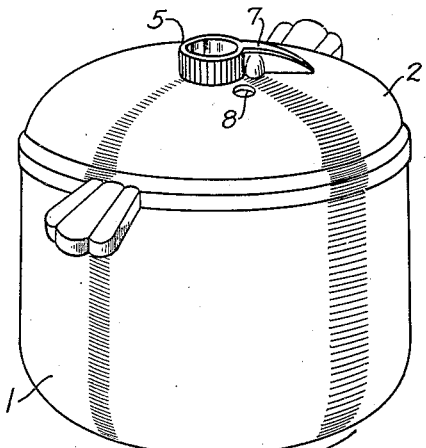
Figure 2:
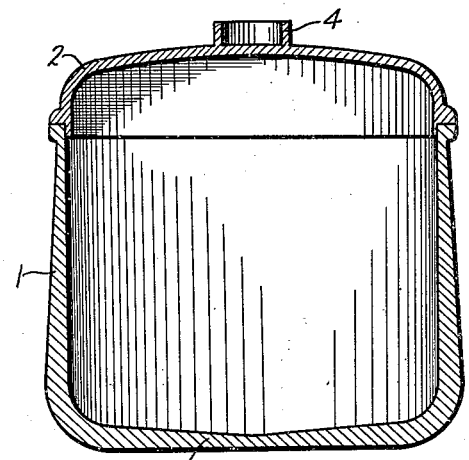
Fig. 2 is a vertical sectional view of the vessel and lid, before mounting thereon the temperature indicator, handle knob and vent closure.
Figure 3:
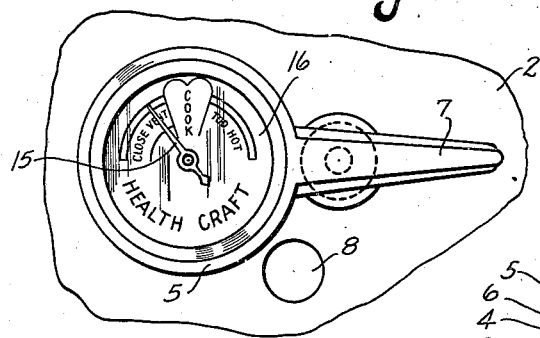
Fig. 3 is an enlarged top plan view of the lid assembly.

While for illustrative purposes the present invention is illustrated in its application to the type of cooking vessel popularly known as a "waterless" cooker, it is to be understood that the several features of the invention are equally applicable to vessels for other purposes. The term "waterless" cooker is applied generally to cooking utensils in which vegetables are cooked with a minimum quantity of water, but not necessarily without water. Thus the term "waterless" is used in a comparative sense. In such class cooking the temperature range is rather critical. The moisture either adherent to the vegetables or the small quantity of water added when starting cooking operation is vaporized within the vessel at slightly below boiling point, and throughout the cooking operation the temperature is preferably not permitted to exceed such temperature. Hence, it is highly important that the temperature indicator be quickly responsive to temperature change and that the time lag between actual change of temperature and its indication be minimized, and further it is equally important that the indicated temperature be as nearly as possible the average or mean temperature within the vessel and not that of one particular area, which may be either greater or less than the effective temperature throughout the vessel.

It is customary when starting cooking operation to purge the air from the vessel by opening a vent, and subsequently close the vent to retain the generated vapors. In the present instance, the rotation of the handle knob serves to open and close the vent. For sanitary reasons, it is desirable that there be no screws, rivets, or other fastenings or projections upon the under surface of the lid. The inner face of the present cooker lid is uniform and smooth, and the several parts are mounted wholly on the exterior of the lid.

Referring to the drawing, 1 is the cooker vessel, of which 2 is the lid. Such cookers are ordinarily of cast aluminum, although other metals and alloys may be employed. Moreover, the present invention is not necessarily restricted to cast cooker ware, but may be applied to pressed or spun sheet metal utensils.

For increased efficiency the side walls and bottom of the vessel 1 are of tapered thickness. The bottom 3 is of plano-concavo form with its concave face uppermost. The side walls are of decreasing thickness upwardly, with the area of greatest thickness at the juncture of the side walls and the bottom. It has been found by experiment that such variation of thickness of the vessel walls effects a more uniform distribution of heat and equalizes the cooking action throughout different parts of the container. The plano-concavo bottom tends to draw heat from the center area of maximum temperature which is in contact with the flame toward the side walls. This action not only transfers more heat to the side walls and thence to the lid, but it also greatly minimizes burning of the contents of the vessel. The concave interior bottom drains whatever condensation or unvaporized moisture to the central area of maximum temperature to prevent burning of the food and facilitates vaporization. As the result of such heat transference, the temperature of the lid 2 is the resultant of the more or less unequal heating effect throughout the vessel and approximates the mean or average temperature thereof. Consequently, the temperature of the lid conductivity applied to the indicator unit affords a more nearly constant indication of actual conditions within the vessel.

Integrally formed in concentric relation on top of the lid 2 is a hollow, cup-shaped boss 4, the bottom of which is completely closed. Rotatively mounted exteriorly of the cup-shaped boss is a handle knob comprising an annular collar portion 5, which is interiorly rabbeted or counterbored at 6, and a radial projection or finger 7.

Eccentrically positioned in the lid 2 is a vent opening 8. The handle knob finger 7 is formed with a recess 9 on its under side, within which is disposed a gravity operated valve 10. As the handle knob 5 is rotated to and fro about the hollow boss 4, the closure valve 10 is carried into and out of registry with the vent opening 8. The margin of the vent 8 is preferably, but not necessarily, slightly beveled to receive the valve 10, the under side of which is of convex form. Fixedly secured within the hollow or cup-shaped boss 4 is a temperature indicating unit. This comprises a shell or housing 11, having a peripherally enlarged head 12 which overhangs the top of the boss 4 and seats within the internal rabbet 6 of the rotary handle knob. The indicator unit thus serves to retain the handle knob upon the boss 4, and limits its axial movement while permitting unrestricted rotation by which the valve is adjusted to alternately open and close the vent.

Figure 4:
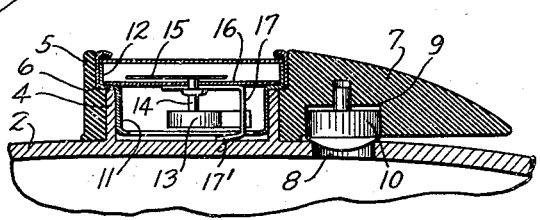
Fig. 4 is an enlarged sectional view.
Figure 5:
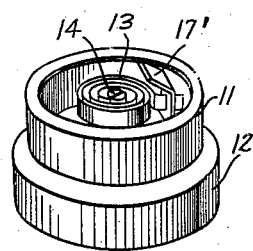
Fig. 5 is a perspective view of the temperature indicator unit in inverted position.

The temperature indicator unit may be of any suitable detail construction. That illustrated comprises a spiral thermally responsive element 13, the inner end of which is connected with a vertical rock shaft 14, which carries a pointer hand 15 coacting with a dial 16. The opposite end of the thermal element 13 is engaged with a supporting post 17 of heat conductive material. As shown in the drawing, this post 17 is of substantially U-shape, a longer arm of which extends parallel with the dial 16, while the opposite shorter arm 17' projects angularly beyond the thermal element 13 and initially projects beyond the unit housing 11, as shown in Fig. 5, and by dotted lines in Fig. 4. The post 15 is not only heat conductive, but is also of resilient character, whereby when the indicator unit is inserted within the hollow boss 4, the protrudinal end 17' of the support makes yielding contact engagement under tension with the bottom of the recess. The indicator unit may be secured in any suitable manner within the recessed boss 4. It is preferably pressed there in with a tight press fit. In such assembled relation the heat conductive extremity 17' having direct contact with the lid 2, to which heat is transferred from all parts of the vessel, transmits heat therefrom to the thermally responsive element 13 by conduction. It is found in practice that the mode of heat transference herein shown and described, results in quick response of the indicator to temperature fluctuations, thereby minimizing the lag period between the temperature change and its indication. By the conductive transference of heat throughout the vessel 1 and thence to the lid 2, quite accurate and reliable indication of thermal conditions within the cooker is enabled.

The tight press fit of the heat indicator within the hollow boss 4 affords a leak tight joint which effectively protects the indicator mechanism against the entrance of water while the lid is being washed. This has been found a quite desirable feature, not only to prevent deterioration of the indicator, but also for sanitary reasons. The smooth uninterrupted interior surface of the lid, devoid of screws, rivets, projections or depressions other than the vent hole 8 also is conducive to better sanitation, and prevents entry of steam or water vapor into the indicator.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a cooker of the waterless type, a cast metal vessel including a plano-concave bottom having its concave face uppermost and side walls of upwardly tapering thickness and a metallic lid resting upon the side walls to which heat is conductively transferred from all parts of the vessel, a central recessed integral boss on the lid, a handle knob rotatively mounted exteriorly of the boss, a radially projecting portion on the handle knob, a valve carried by the projection into and out of registry with a vent opening in the lid upon rotation of the handle knob, and a temperature indicator positioned within the recessed boss in overlapping relation with the rotative handle knob, including a thermally responsive element, a resilient heat conductive mount therefor having tensioned direct contact with the lid, and a temperature indicator actuated thereby.

2. In a cooker of the waterless type, a vessel of cast metal including a plano-concave bottom having its concave face uppermost and side walls of upwardly tapering thickness, a heat conductive lid resting on the side walls to which heat is transferred by conduction from all parts of the vessel, a thermally responsive element mounted in heat conductive relation with the lid, and a temperature indicator actuated by the reaction of the thermally responsive element, the construction and arrangement being such that temperature fluctuations are transmitted by conduction from different parts of the vessel of the thermally responsive element thereby rendered quickly responsive to the mean temperature of the vessel as a whole.

3. A cooking vessel including a lid having an eccentrically positioned vent opening therein, a central hollow boss projecting from the top of the lid, a knob rotatively mounted exteriorly of the boss, a temperature indicating unit mounted interiorly of the boss including a housing overhanging the rotative knob and limiting its axial adjustment while permitting free rotative adjustment thereof, a thermally responsive element within the housing, a temperature indicator actuated thereby, a heat conductive coupling directly connecting the thermally responsive element with the lid through which heat is conductively transmitted directly from the lid to the thermally responsive element, and a closure valve for the vent opening movable into and out of registry with the vent opening by the rotative adjustment of the collar.

4. The combination with a cooking vessel lid of a temperature indicating unit mounted thereon, including a thermally responsive element, a temperature indicator actuated thereby and a yielding tensioned heat conductive member thermally connecting the thermally responsive element directly with the lid through which heat is conductively transmitted from the lid to the thermally responsive element.

5. The combination with a cooking vessel lid of an integral cup-shaped boss thereon closed at its bottom, a temperature indicating unit including a housing fitted within the cup-shaped boss, a thermally responsive element therein, a temperature indicator actuated by the reaction of the thermally responsive element, and a conductive member with which the thermally responsive element engages and having yielding tensioned contact engagement with the bottom of the cup-shaped boss for conductive transmission of heat from the lid directly to the thermally responsive element.

6. A cooking vessel lid, including an exteriorly located integral cup-shaped boss closed at its bottom, a thermally responsive element located within the cup-shaped boss in direct thermally coupled relation with material of the lid, and a temperature indicator actuated by the reaction of the thermally responsive element, the construction and arrangement being such that heat is conductively transmitted directly from the lid to the thermally responsive element.

7. A cooking vessel lid, including an integral socket portion closed at its bottom for reception of a temperature indicating unit, the construction and arrangement being such that a smooth uninterrupted surface is presented on the under side of the lid.

8. A cooking vessel lid, including a duo-functional upstanding cup-shaped boss projecting from the top thereof for receiving externally a rotatively mounted knob and receiving internally a temperature indicating unit.

9. A cooking vessel having walls of tapered thickness and a plano-concavo bottom disposed with its concave face upward, the vessel walls being of greatest thickness in proximity of the juncture of the side walls and bottom, and of gradually decreasing thickness vertically upwardly and radially inwardly respectively.

10. A cooking vessel lid, a recessed boss thereon closed at its bottom, a temperature indicator unit fixedly mounted in the recessed boss including a housing engageable with the boss, a thermally responsive element enclosed within the housing, an indicator actuated by the reaction of the thermally responsive element and a yielding tensioned support of heat conductive material with which the thermally responsive element is directly connected within the housing and initially projecting therebeyond for tensioned contact engagement with the vessel lid, the construction and arrangement being such that the heat of the lid is transmitted by conduction directly from the lid to the thermally responsive element by the support.

11. The combination with a cooking vessel of a temperature indicating unit mounted thereon, including a thermally responsive element, a temperature indicator actuated by the reaction thereof and a yielding tensioned heat conductive member directly coupling the thermally responsive element with the vessel by which heat is transferred by direct conduction from the vessel directly to the thermally responsive element.

12. A cooking vessel lid having an eccentric vent opening therein, a temperature indicator unit centrally disposed thereon, a non-metallic collar rotatively surrounding the temperature indicator unit including a radially projecting finger, and a valve carried by the finger and moved into and out of registry with the vent opening by the rotation of the collar.

13. A cooking vessel lid having therein an eccentrically positioned vent opening, a rotary knob centrally disposed on the lid, a radially projecting portion carried by the knob, and a closure valve for the vent opening carried by the radial portion of the knob and moved into and out of operative relation with the vent opening by partial rotation of the knob.

14. A cooking vessel lid including a hollow central boss, a rotary knob surrounding the boss, a temperature indicator unit seated within the hollow boss in overlapping relation with the rotary knob, the construction and arrangement being such that the knob is capable of rotary motion independently of and relative to the thermal indicator unit, but its axial movement is limited thereby.

15. A cooker vessel lid, including an integral imperforate socket thereon to receive a temperature indicator and a thermally responsive indicating unit inserted therein with a press fit sufficiently leak tight to exclude moisture from the interior of the socket, so constructed and arranged as to present a smooth uninterrupted surface on the under side of the lid.

ROBERT W. HAILEY.

CERTIFICATE OF CORRECTION.

Patent No. 2,254,570.　　　　　　　　　　　　　　　September 2, 1941.

ROBERT W. HAILEY.

It is hereby certified that error appears in the printed specification of the above numbered patent requiring correction as follows: Page 1, second column, line 49, for the word "Live" read --Like--; page 3, first column, line 52, claim 2, for "of" after "vessel" read --to--; and that the said Letters Patent should be read with this correction therein that the same may conform to the record of the case in the Patent Office.

Signed and sealed this 21st day of October, A. D. 1941.

(Seal)　　　　　　　　　　　　　　　　　　　　　　Henry Van Arsdale,
　　　　　　　　　　　　　　　　　　　　　Acting Commissioner of Patents.